United States Patent Office
3,737,458
Patented June 5, 1973

3,737,458
PRODUCT OF ALPHA MONOLITHIATED AMINE AND CARBONYL COMPOUNDS
Arthur W. Langer, Jr., Watchung, N.J., assignor to Esso Research and Engineering Company
No Drawing. Continuation-in-part of application Ser. No. 825,384, May 16, 1969, now Patent No. 3,536,679, which is a continuation-in-part of application Ser. No. 589,240, June 24, 1969, now Patent No. 3,451,988, which in turn is a continuation-in-part of applications Ser. No. 266,188, Mar. 19, 1963, and Ser. No. 290,315, June 25, 1963, both now abandoned. This application Aug. 6, 1970, Ser. No. 61,813
Int. Cl. C07c 85/00
U.S. Cl. 260—570 R  9 Claims

ABSTRACT OF THE DISCLOSURE

A method for forming an amine adduct of a compound that reacts in a "Grignard" manner, said method comprising the step of reacting an alpha mono lithiated amine, said amine being characterized by one of the following structural formulae:

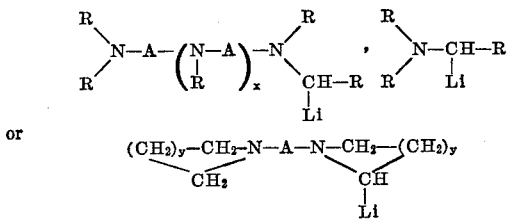

wherein R can be the same or different and is a $C_1$–$C_{10}$ alkyl; X is an integer of 0 to 10,000; y is an integer of 0 to 3; and A is a radical which is (1) a cycloaliphatic radical or a cycloaliphatic radical containing $C_1$–$C_4$ alkyl groups, said radicals having ring structures of 4 to 7 members and being attached to the nitrogen atoms at 1,2 or 1,3 positions on said ring; or (2) a radical consisting of 1 to 20 methylenic groups wherein each methylenic group contains 0 to 2 monovalent hydrocarbon radicals of 1 to 6 carbon atoms, with a compound that reacts in a "Grignard" manner under conditions of temperature, concentrations of reactants and pressures sufficient to form said amine adduct.

In addition, this invention relates to a method for preparing an organo-lithium amine complex which comprises admixing a lithiated amine similar to the one described hereinabove with a hydrocarbon group-containing compound having an acidity corresponding to a pKa of not more than 38.

This application is a continuation-in-part of copending application Ser. No. 825,384, filed May 16, 1969, now U.S. Pat. 3,536,679 entitled "Lithiated Amine Polymerization Catalyst" which in turn is a continuation-in-part of an application bearing Ser. No. 589,240 which was issued on June 24, 1969 as Pat. No. 3,451,988 entitled "Polymerization Catalyst and Uses Thereof" which in turn was a continuation-in-part of Ser. No. 266,188, filed Mar. 19, 1963 (and now abandoned) and Ser. No. 290,315, filed June 25, 1963 (and now abandoned).

In this invention, $C_4$–$C_{12}$ conjugated diolefins and $C_3$–$C_{10}$ anionically polymerizable polar monomers may be homo-polymerized or copolymerized with each other to yield polymers which range from liquids to solid or rubbery products. The copolymers of the conjugated diolefins with the polar monomers may be either random or block in nature, depending upon the particular choice of reaction conditions and the diolefins and polar monomer. The polymers may be liquid, rubbery or solid in nature and have number average molecular weights in the range of 500 to 1,000,000, depending on the monomers and conditions employed.

The conjugated diolefins useful in this invention are aliphatic, cycloaliphatic or aromatic hydrocarbons having 4 to 12 carbon atoms. Suitable nonlimiting examples include butadiene-1,3, isoprene, the 2-alkyl-1,3-butadienes, the 2,3-dialkyl-1,3-butadienes, piperylene, hexadiene-1,3, hexadiene-2,4, cyclohexadiene-1,3, 1-phenylbutadiene-1,3, 2-phenylbutadiene-1,3, and the like. The process is particularly effective for isoprene and butadiene-1,3 and especially useful with the latter.

The polar monomers which may be homopolymerized or copolymerized with the conjugated diolefins are anionically polymerizable monomers containing 3 to 20 carbon atoms. A wide variety of such monomers exist and typical, nonlimiting examples include acrylonitrile, styrene, alpha-methylstyrene, methyl methacrylate, ethyl methacrylate, butyl methacrylate, vinyl naphthalene, methacrylonitrile, dimethylketone, ethylene oxide, propylene oxide, N,N-dialkylacrylamides, N-vinylcarbazole, acetaldehyde, etc. The preferred polar monomers are acrylonitrile and styrene.

The polymers are prepared by contacting the monomer(s) (i.e. conjugated diolefin and/or polar monomer) with a lithiated amine catalyst (defined below) in the presence or absence of an inert $C_2$–$C_{20}$ saturated aliphatic or cycloaliphatic or $C_6$–$C_{20}$ aromatic hydrocarbon such as pentane, isopentane, hexane, heptane, isooctane, cyclopentane, cyclohexane, cyclooctane, decahydronaphthalene, decane, hexadecane, and the like, or benzene, toluene, ethylbenzene, the xylenes, naphthalene, tetrahydronaphthalene and the like. Ethers, tertiary amines and other more polar solvent may be used for polymerizations in which their functionality does not destroy the polymer anions.

The diolefin and/or polar monomer concentration in the diluent (if one is used) may vary from 1 to 100 wt. percent, preferably 10 to 50 wt. percent. The polymerization reaction is then carried out at a temperature in the range of about −100° to 100° C., preferably −60° to 80° C. The monomer(s) should remain in contact with the catalyst for about 0.1 to 10 hours, during which time, more monomer(s) may be added so as to maintain the monomer(s) concentration at the desired level. Atmospheric pressure is generally satisfactory although pressures up to 500 p.s.i.g. or more can be used.

The polymerization reaction may, of course, be carried out as a batch or continuous operation in which case the catalyst components, preferably mixed with sufficient diluent, may be continuously added to the reactor either separately or previously combined. Separate streams of additional diluent may also be incrementally or continuously added so as to maintain a suitable polymer concentration in the diluent, achieve desirable monomer conversion, and obtain a high catalyst efficiency, i.e., in the range of 50 to 1000 g. polymer per g. catalyst.

The amount of monomer(s) added will, of course, be determined by the desired molecular weight of the polymer, reaction time, type of diluent, desired monomer conversion, etc., but can advantageously be in the range of about 100 g. to 10,000 g. monomer(s) per g. catalyst when the reaction is carried out patch-wise. Normally, it is preferable for good operability to limit concentration of high molecular weight polymer in the reaction mixture to less than 50 wt. percent, if necessary, the polymer concentration can be maintained at or below this level by the addition of more monomer(s) and/or more diluent during the polymerization reaction.

When the desired degree of polymerization has been reached, the polymer can be isolated by the addition of 0.1 to 100 volumes of a nonsolvent such as a $C_1$–$C_6$ alcohol (e.g. methyl alcohol, isopropyl alcohol), water, etc. Alternatively, the reaction mixture can be injected into a slurry tank containing a hot nonsolvent whereupon the solvent is flashed off and the polymer remains as a slurry with the nonsolvent; if desired, the solvent can also be removed directly by the application of heat and/or flashing to a lower pressure. If the polymer products are to be utilized in a hydrocarbon solution form, simple water washing of the reaction mixture at room temperature will suffice to remove catalyst residues.

The polymerization catalyst to be used in this invention is a monolithiated amine. This catalyst is formed by mixing an organolithium with a certain type of amine and allowing the mixture to "age" until the desired monolithiated amine has been formed.

The organolithium component used in preparing the monolithiated amine has the formula R'Li wherein R' is a monovalent alkyl or cycloalkyl hydrocarbon radical of 1 to 16, preferably 2–8 carbon atoms. Types of suitable R' groups include aliphatic radicals and cycloaliphatic radicals, such as alkyl, cycloalkylalkyl, cycloalkyl and alkyl-cycloalkyl.

Specific examples of R' groups for substitution in the above formula include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methylcyclopentyl-ethyl, cyclopentyl, cyclohexyl, 2,2,1 - bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Preferably, the first component is an alkyl lithium wherein the alkyl radical contains 2 to 8 carbon atoms. Particularly preferred herein is butyllithium. The second component used to prepare the catalyst of this invention is an amine falling within the scope of the formulas:

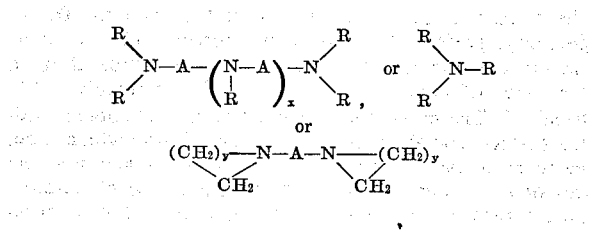

In the above formulas, the R groups are the same or different $C_1$–$C_4$ normal alkyl radicals (i.e. methyl, ethyl, n-propyl and n-butyl); $x$ is an integer of 0 to 10,000; $y$ is an integer of 1 to 4; and A is a radical which is (1) a cycloaliphatic radical or a cycloaliphatic radical containing lower alkyl (i.e. $C_1$–$C_4$) groups, which radicals have ring structures of 4 to 7 members and are attached to the nitrogen atoms at 1,2 or 1,3 positions on the ring; or (2) a radical consisting of 1 to 20 methylenic groups wherein each methylenic group may contain 0 to 2 monovalent hydrocarboin radicals of 1 to 6 carbon atoms (i.e. monovalent hydrocarbon radicals such as methyl, ethyl, propyl, pentyl, hexyl, etc. are suitable), Specific, nonlimiting examples of useful amines include:

N,N,N',N'-tetramethyl methanediamine,
N,N,N'N'-tetramethyl-1,2-ethanediamine,
N,N,N',N'-tetramethyl-1,3-propanediamine,
N,N,N',N'-tetramethyl-1,4-butanediamine,
N,N,N',N'-tetramethyl-1,5-pentanediamine,
N,N,N',N'-tetramethyl-1,8-octanediamine,
N,N,N',N'-tetramethyl-1,10-decanediamine,
N,N,N',N'',N''',N'''-hexamethyltriethylene-tetramine,
N,N,N',N'',N''-pentamethyldiethylenetriamine,
poly-(N-ethyl ethyleneimine),
poly-(N-methyl ethyleneimine),
N,N,N',N'-tetramethyl-1,2-cyclopentanediamine,
N,N,N',N'-tetramethyl-1,2-cyclohexanediamine (cis-, trans- and mixtures of cis- and trans- isomers),
N,N,N',N'-tetramethyl-1-cyclohexyl-1,2-ethanediamine,
1,2-dipiperidylethane,
N,N,N',N'-tetramethyl-2,3-butanediamine,
N,N-dimethyl-N',N'-diethyl-1,2-ethanediamine,
trimethylamine,
octyl dimethylamine,
N,N,N',N'-tetramethyl-1,2-eicosanediamine, and the like.

Preferably, the amine employed in preparing the monolithiated polymerization catalyst is one which undergoes the aging (i.e. metalation) reaction with the organolithium quite readily. Such amines have the formula:

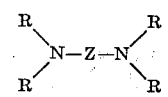

wherein the R groups are the same or different $C_1$–$C_4$ normal alkyl radicals, preferably at least one R group being methyl and most preferably, all R groups being methyl and Z is (1) a cycloaliphatic radical or a cycloaliphatic radical containing lower alkyl (i.e. $C_1$–$C_4$) groups which radicals have ring structures of 4 to 7 members and are attached to the nitrogen atoms at 1,2 or 1,3 positions on the rings; or (2) a radical consisting of 1 to 4 methylenic radicals, wherein each methylenic group may contain 0 to 2 monovalent hydrocarbon radicals of 1 to 6 carbon atoms (i.e. monovalent hydrocarbon radicals such as methyl, ethyl, propyl, pentyl, hexyl, etc. are suitable).

Particularly preferred amines include N,N,N',N'-tetramethyl - 1,2 - ethanediamine; N,N,N,'N'-tetramethyl-1,3-propanediamine; N,N,N',N'-tetramethyl - 1,4 - butanediamine; N,N,N',N' - tetramethyl - 1,2 - cyclohexane diamine in its cis-, trans- or mixtures of cis- and trans-forms.

The choice of the particular organolithium and particular amine is not crucial so long as the organolithium is one which is reactive enough to metalate a primary or secondary hydrogen atom on a carbon atom linked to nitrogen, i.e. the amine must have a structure of the type

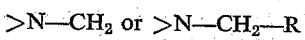

Neither the organolithium nor the solvent used (if any) may contain groups more acidic than the most acidic hydrogen atoms in the amine since they would undergo metalation preferentially.

The monolithiated amine catalyst used herein may be prepared by mixing the selected alkyl or cycloalkyl lithium and the amine, with or without an inert diluent (e.g. a saturated hydrocarbon), and allowing the mixture to age until the metalated species forms. The molar ratio of amine to organolithium should preferably be kept within the limits of about 0.5:1 to 1:1. The amine may be used in excess in some cases under mild conditions, but normally an excess is to be avoided as it may promote decomposition of the lithiated amine to form lithium dialkylamide.

The aging reaction is carried out at temperatures in the range of —50° to 100° C., preferably between 0° and 40° C. and most preferably at room temperature. The aging time required for complete metalation ranges from 1 minute to several months, but for most combinations of organolithiums and amines, the reaction is complete in about 10 minutes to 2 weeks. The aging reaction is illustrated by the following typical equation.

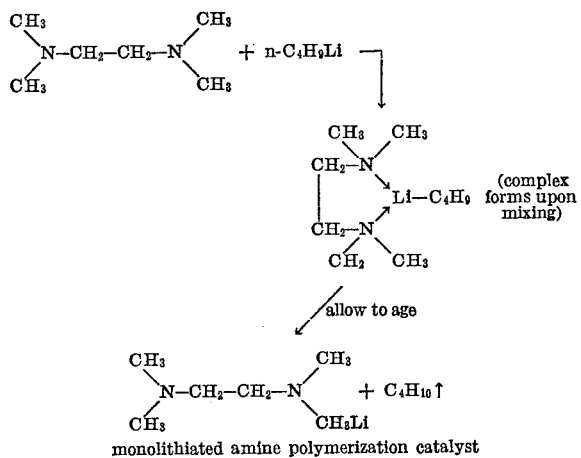

monolithiated amine polymerization catalyst

The monolithiated amine polymerization catalyst will have a structure such that the lithium atom will be attached to a primary or secondary carbon atom linked to the nitrogen atom in the amine. Where more than one secondary carbon atom is present (e.g. in the case of n-propyl or n-butyl), the lithium atom will be attached to the secondary carbon atom which is alpha to the nitrogen atom. If the amine contains primary and secondary carbon atoms linked to nitrogen atoms, the lithium atom preferentially attaches to the primary carbon atom.

The lithiated amine compounds, said amine being characterized by one of the following structural formulae:

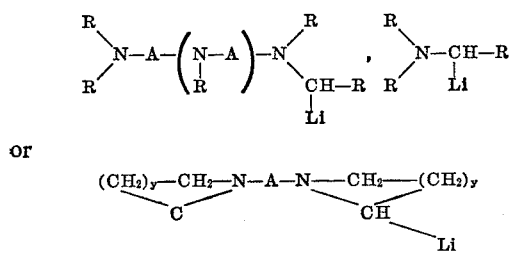

wherein R can be the same or different and is a $C_1$–$C_{10}$ alkyl; X is an integer of 0 to 10,000; $y$ is an integer of 0 to 3; and A is a radical which is (1) a cycloaliphatic radical or a cycloaliphatic radical containing $C_1$–$C_4$ alkyl groups, said radicals having ring structures of 4 to 7 members and being attached to the nitrogen atoms at 1, 2 or 1, 3 positions on said ring; or (2) a radical consisting of 1 to 20 methylenic groups wherein each methylenic group contains 0 to 2 monovalent hydrocarbon radicals of 1 to 6 carbon atoms, employed in this invention, have also been found to undergo "Grignard-type" metalation reactions.

Grignard reactions are well known in the prior art; it has been found, however, that the lithiated amine compounds undergo the same types of reactions as the classical RMgX compounds. Thus, the lithiated amine compounds will undergo the same reactions as those shown in "Grignard Reactions of Nonmetallic Substances" by Kharasch and Reinmuth (Prentice-Hall, 1954) incorporated herein by reference.

The types of compounds which can be reacted with the lithiated amines in a "Grignard" manner are as follows:

(1) cyclic and acyclic aldehydes, ketones, ketenes, alpha-haloketones,
(2) quinones,
(3) esters (saturated or alpha, beta-unsaturated) and lactones,
(4) carbonyl halides, e.g. acid halides, phosgene, alpha-halo acid halides, alpha, beta-unsaturated acid halides, haloformic esters, etc.,
(5) nitriles and cyano compounds, e.g. saturated nitriles, alpha,beta-unsaturated nitriles, cyanohydrins, alpha-halonitriles, cyanogen, cyanogen halides, cyanamides, etc.,
(6) carboxylic anhydrides,
(7) carboxylic amides, imides and lactams, including alphahalo amides, alpha,beta-unsaturated amides, etc.,
(8) oxides of carbon, e.g. carbon suboxide, carbon monoxide, carbon dioxide, etc.,
(9) epoxides,
(10) ethers, acetals and ketals, including acyclic and cyclic ethers, thio and seleno ethers,
(11) miscellaneous nitrogen compounds, including aldimines, ketimines, heterocyclic amines (e.g. pyridine), aldazines, hydramides, carbodiimides, phenylhydrozones and osazones, oximes and isonitroso compounds, diazo compounds, nitroso compounds, N-nitrosoamines, azoxy compounds, furoxans, amine oxides and nitrile oxides, hydroxylamines and alkoxy amines, nitro compounds, nitrates and nitrites, azo compounds, quaternary salts, ammonia, amines, hydrazines and triazenes, isonitriles, etc.,
(12) miscellaneous sulfur compounds including alkyl sulfates, sulfonic esters, sulfites, sulfinates, sulfenates, thiosulfonates, thiocarboxylates, sulfur dioxide, sulfonyl halides, thionyl and sulfuryl chlorides, chlorosulfonates, sulfur chlorides, sulfones, thioketones, etc.,
(13) miscellaneous silicon compounds, including silicon halides, silicon esters, etc.,
(14) miscellaneous non-metallic compounds including halogens, boric esters, boric trihalides, phosphines, phosphorus trichloride, monochloro and dichloro phosphine derivatives, phosphorus pentachloride, phosphoryl chloride, phosphoric and phosphorous esters, etc.

The "Grignard-type" reaction may be carried out by contacting 0.1 to 10 moles of the lithiated amine with one mole of the above type of compound at temperatures in the range of —100° to 100° C., preferably —80° to 50° C. for about 1 sec. to 60 minutes; generally a 1:1 molar ratio of the lithiated amine and compound will be sufficient and the reaction will be very rapid. The resultant lithium salt may then be hydrolyzed so as to obtain the corresponding amine adduct of the reactant compound.

It has been found that particularly useful new compositions of matter can be obtained if the lithiated amine used in the "Grignard-type" reaction was one prepared by using the "preferred" type of amine, i.e. one described above as having the formula $R_2N$—Z—$NR_2$. The lithiated-"preferred" amine will, subsequent to the "Grignard-type" reaction and hydrolysis, result in a new chelating agent containing a new functionality derived from the reactant compound.

The "Grignard-type" reaction may be illustrated by the following equation which utilizes a "preferred" amine (i.e., N,N,N',N' - tetramethyl - 1,2 - ethanediamine, "TNEDA"), butyllithium, and methyl ethyl ketone thereby resulting in a new type of chelating agent:

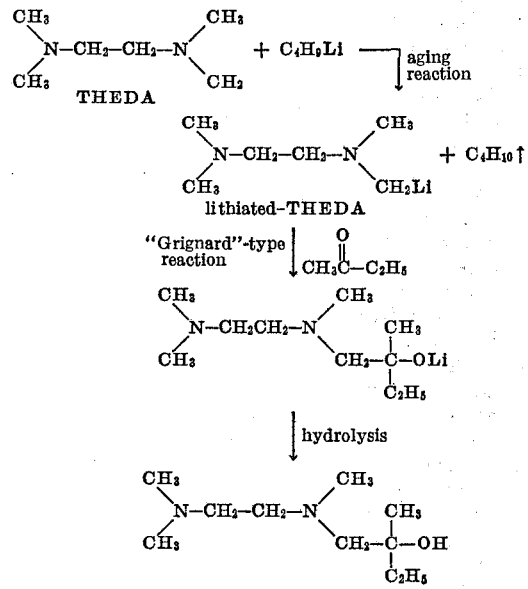

The new types of chelating agents prepared with the aid of the "preferred" amines are especially useful as scavengers for numerous metal ions, flotation processes, metal separation processes, as catalyst components, etc.

As mentioned above, the lithiated amines of this invention will also undergo metalation reactions. In the metalation reaction, the lithiated amine is contacted with a hydrocarbon group-containing compound of the type described below, thereby resulting in compositions which may be utilized for polymerization catalysts for the homo- or copolymerization of ethylene, diolefins, polar monomers, etc.; as telomerization catalysts, whereby, e.g. ethylene, may be "grown" onto aromatic hydrocarbons to yield detergent bases and high quality waxes, as reagents in Grignard-type reactions leading to the preparation of acids, alcohols, ketones, etc.

The metalation reaction may proceed by two pathways. Where the amine used in preparing the lithiated amine is a "preferred" amine (i.e. of the type $R_2N-Z-NR_2$)

the hydrocarbon group-containing reactant compound will become attached to the lithium present as a complex with the amine; in the case of other amines, the entire lithium-hydrocarbon group-containing moiety may exist as a separate compound. These pathways are illustrated by the following equations:

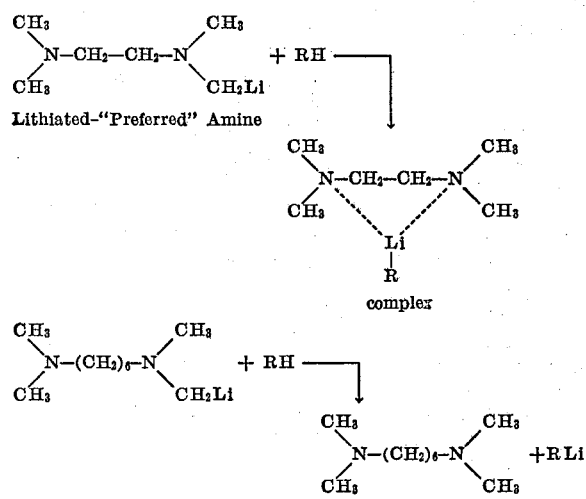

The metalation reaction will proceed so long as the hydrocarbon group-containing compound (RH in the above equation) is one which has an acidity corresponding to a pKa of about 38 or less, on the MSAD pKa scale. Some organic compounds having such a pKa are shown on page 19, Table XIV of "Fundamentals of Carbanion Chemistry" by D. J. Cram (Academic Press, 1965).

In general, the useful hydrocarbon group-containing compounds will be those monomers or polymers whose monomeric units have the general formulas:

$(R'H)_a Y_b (R'')_c$ or $(R'')_c Y_b (CH)_d$ or $R'''H$ wherein R' is a $C_3-C_{30}$ hydrocarbon radical and the hydrogen attached to R' is an aromatic, benzylic or allylic hydrogen atom; Y is oxygen, nitrogen, phosphorus, silicon or sulfur; R" is hydrogen or a $C_1-C_{30}$ hydrocarbon radical such as alkyl, aryl, aralkyl, cycloalkyl, etc.; R''' is a $C_6-C_{30}$ hydrocarbon radical containing at least one aromatic hydrogen atom, benzylic hydrogen atom, acetylenic hydrogen atom or allylic hydrogen atom; b is an integer representing the valence of Y; a and c are integers whose sum is equal to the value of b; d is an integer of at least 1; and the sum of c and d is equal to the value of b.

Representative examples of the useful compounds are (a) alcohols such as phenol, benzyl alcohol, methanol, isopropanol, t-butanol, etc.; (b) ethers such as methyl phenyl ether (anisole), diphenyl ether, p-tolyl butyl ether, benzyl ethyl ether, allyl ethyl ether, propenyl propyl ether, dibenzofuran, cyclohexyl methyl ether, etc.; (c) primary, secondary and tertiary amines such as 4-ethyl-N,N,N',N' - tetramethyl-o-phenylenediamine, 2,5-dimethylpyridine, N,N-diethyl aniline, trimethyl amine, methyl dibutyl amine, N-methyl piperidine, diphenyl amine, diethyl amine, piperidine, etc.; (d) primary, secondary and tertiary phosphines such as butyl phosphine, diphenyl phosphine, dimethyl phosphine, trimethyl phosphine, diethyl phenyl phosphine, diphenyl methyl phosphine, etc., (3) silanes such as trimethyl silane, tetramethyl silane, triphenylmethyl silane, etc.; (f) mercaptans and sulfides such as methyl mercaptan, phenyl mercaptan, benzyl mercaptan, methyl sulfide, allyl propyl sulfide, phenyl ethyl sulfide, cyclohexyl methyl sulfide, etc.; (g) unsaturated hydrocarbons such as propylene, pentene-1, pentene-2, butene-2, octene-1, octene-2, allylbenzene, butenylbenzene, 1,5-hexadiene, acetylene, hexyne-1, etc.; (h) polymers such as polybutadiene, polystyrene, polyisoprene, styrene-isobutylene copolymers, butyl rubber, polyvinylalcohol, poly (N-methylethyleneimine), polydimethylsiloxane, poly (p-phenoxystyrene), poly (p-eicosyloxystyrene), poly (p-triacontylstyrene), poly (p-didecylaminostyrene), polyvinylpyridine, poly (2,6-dimethyl-1,4-phenylene ether), poly (p-t-butylstyrene), poly (p-methoxystyrene), polyethyleneimine, ethylenepropylenediene terpolymers where the diene may be butadiene, isoprene, piperylene, 1,6-hexadiene, ethylidenenorbornene, cyclohexadiene or related compounds, butadienestyrene copolymers, polyethylene - episulfide, polyallylbenzene, polyvinylcyclopropane, polybenzylvinyl ether, polychloroprene, polyhexa-methylene sulfone, polymers having recurrent units characterized by the following structure:

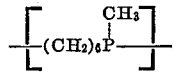

polyvinyl trimethylsilane, methylmercaptan or dimethylphosphine adducts of unsaturated polymers such as butyl rubber, polybutadiene, etc.; (i) hydrocarbons such as benzene, naphthalene, diphenyl, fluorine, toluene, xylene, triphenyl methane, thiophene, dibenzene chromium and ferrocene.

Homopolymers may be random, isotactic or syndiotactic. Polymers which contain two or more monomers may contain random, block, alternating or graft structures.

The hydrocarbon group-containing compound of choice may be any one of those having the requisite pKa set forth above. However, it is preferred that the organic compound not contain any conjugated double bonds, allenic bonds or acetylenic bonds since these compounds may undergo side reactions rather than or in addition to the metalation reaction.

The hydrocarbon group compounds are all metalated at their most acidic position to yield the corresponding hydrocarbon lithium (complexed or uncomplexed). Thus, for example, hydrocarbons having aromatic benzylic or allylic hydrogen would produce compounds in which the lithium atom is attached to the aromatic nucleus, benzylic position or allylic positions. The resultant lithium hydrocarbons alone or as complexes (which in many cases are crystalline in nature) may be used in the form of the reaction mixture or they may be recovered from the reaction mixture at temperatures in the range of $-100°$ to $+50°$ C. depending on stability; conventional recovery methods may be employed, e.g., crystallization, addition of non-reactive non-solvents, solvent removal, etc.

The metalation reaction is effected in the liquid phase at temperatures of about $-100°$ C. to about $+100°$ C., preferably $-50°$ C. to $+50°$ C., by merely admixing the lithiated amine and the hydrocarbon group-containing compound; the reaction time is generally short and the complete reaction usually occurs within about 1 minute to about 4 hours, although up to several days may be required in some cases when the metalation driving force is small.

If desired, the metalation reaction may be effected in a hydrocarbon diluent which is not reactive with the components, e.g. a $C_5$–$C_{10}$ alkane or cycloalkane such as hexane, heptane, cyclohexane, etc. Alternatively, extraneous diluents need not be used and an excess of the hydrocarbon group-containing compound itself may be employed as the diluent. With strongly acidic compounds, stoichiometric amounts of the compound (i.e. a 1:1 molar ratio of compound to lithiated amine) may be used. With weakly acidic compounds, the compound is employed preferably in excess of the stoichiometric amount, based on the lithiated amine, thereby fostering the completness of the metalation reaction.

It has also been discovered that the hydrocarbon group-containing compound may be a halide. In this case, metalation occurs by abstraction of hydrogen from the carbon atoms attached to the halogen atom. Suitable halides are fluorides, chlorides, bromides and iodides wherein the the hydrocarbon group may be alkyl, aralkyl, cycloalkyl, vinyl, alkenyl, aryl, etc. With aryl halides, metalation occurs predominantly ortho to the halide but side reactions involving the C—Cl bond also occur.

This invention can be more fully understood by reference to the following examples.

EXAMPLE 1

A monolithiated amine was prepared by mixing equimolar amounts of n-butyllithium and N,N,N',N'-tetramethyl - 1,2 - ethanediamine (hereinafter referred to as TMEDA) in the presence of n-hexane (1.28 molar). The solution was allowed to age for about one week and as a result thereof, it was found that butane was quantitatively evolved; the butane evolution resulted from the abstraction of hydrogen from the TMEDA by the n-butyllithium. Infrared and nuclear magnetic resonance studies of the new lithiated amine compound formed as a result of the aging reaction indicated that it had the structure:

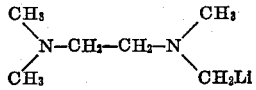

In another series of experiments, monolithiated TMEDA was prepared by mixing a solution of n-butyllithium and TMEDA (0.1 molar of each component in heptane) and allowing the mixture to age at room temperature for 15 days. One portion of the aged solution was hydrolyzed by adding 6 N $H_2SO_4$ and butane was analyzed quantitatively by gas chromatography. One mole of butane was found per mole of starting n-butyllithium showing that no losses had occurred.

A second portion of the 15 day-aged solution was vacuum stripped, heptane was added and then the mixture was hydrolyzed and the product analyzed. No butane was found, showing that butane had been completely evolved during the aging reaction and that the formation of the monolithiated TMED was quantitative.

A third portion of the 15 day-aged solution containing 8 mmoles of each component was vacuum dried. The yield of the dry solid was 0.95 g. The theoretical yield for 8 mmoles of $(CH_3)_2NCH_2CH_2N(CH_3)CH_2Li$ is 0.967 g. showing that formation of the monolithiated TMEDA was quantitative.

EXAMPLE 2

In a separate study, the reaction between equimolar amounts of n-butyllithium and TMEDA (0.61 molar in n-hexane) was followed by nuclear magnetic resonance. As shown in the table below, formation of the monolithiated TMEDA was 93% complete after one week.

| Time, hrs.: | Percent formation of monolithiated TMEDA |
|---|---|
| 0 | 0 |
| 0.5 | 4 |
| 4 | 26 |
| 29 | 60 |
| 47 | 69 |
| 96 | 85 |
| 168 | 93 |

EXAMPLE 3

The structure of monolithiated TMEDA was shown to be $(CH_3)_2NCH_2CH_2N(CH_3)CH_2Li$ by the following:

(A) A nearly quantitative yield was obtained from the aging reaction between n-butyllithium and TMEDA after one week at 25° C.

(B) Nuclear magnetic resonance showed that monolithiation occurred at a TMEDA metal group.

(C) TMEDA was regenerated by reaction with toluene as follows:

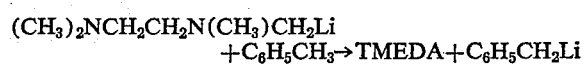

(D) TMEDA was regenerated by hydrolysis with aqueous $H_2SO_4$.

(E) A 0.5 N solution of n-butyllithium·TMEDA in n-heptane was heated to 50° C. for 24 hours to obtain complete monolithiation. Vacuum drying of the product resulted in a yield of 2.29 g. (theory—2.44 g.). Elemental analyses were as follows: Found: C 62.9%; H, 12.97%; Ni 22.14%. Calculated: C 59.0%; H, 12.4%; Ni 22.9%. In a duplicate experiment, the lithium content was found: lithium 5.48%; calculated: lithium 5.68%.

EXAMPLE 4

This example illustrates that a variety of tertiary diamines or triamines may be employed to prepare the monolithiated amines. The various tertiary amines listed below were reacted with equimolar amounts of n-butyllithium (0.5 M in n-heptane) at room temperature for periods of time up to one week. The reactions were followed by nuclear magnetic resonance to indicate when the aging reactions were complete. The following tertiary amines were used:

(1) N,N,N',N'-tetramethyl-1,2-ethanediamine ("TMEDA")
(2) N,N,N',N'-tetramethyl-1,3-propanediamine ("TMPDA")
(3) N,N,N',N'-tetramethyl-1,4-butanediamine ("TMBDA")

(4) N-ethyl-N,N',N'-trimethyl-1,2-ethanediamine ("ETMEDA")
(5) N,N'-dimethyl-N,N'-diethyl-1,2-ethanediamine ("MEMEEDA")
(6) N,N-dimethyl-N',N'-diethyl-1,2-ethanediamine ("DMDEEDA")
(7) N,N,N',N'-tetramethyl-1,2-propanediamine ("TM-1,2-PDA")
(8) N,N,N',N'',N''-pentamethyldiethylenetriamine ("PMDTA")

All of the amines set forth above gave the corresponding lithiated amines subsequent to the aging reactions. The amines shown in number (4)–(7) represent other tertiary diamines with a variety of substituents and structures. In each case, lithiation was found to occur predominantly at an N—$CH_3$ group. PMDTA is a tertiary triamine which yielded the lithiated amine product most rapidly, illustrating that a tridentate amine is more effective than a bidentate amine with organolithium compounds for activating the Li—C bond. However, the lithiated PMDTA is much less stable than the corresponding lithiated tertiary diamine and it must be used quickly or decomposition will result in the formation of inactive Li—N< species. Therefore, when used as catalysts or as organolithium reagents, the lithiated tertiary triamines are less effective than the corresponding lithiated tertiary diamines.

EXAMPLE 5

When TMEDA is lithiated by reaction with sec.-butyllithium or tert.-butyllithium, the reaction takes place much more rapidly than with n-butyllithium under same conditions. Thus, while temperatures in the range of 0° to 50° C. are preferred for use with n-butyllithium, temperatures between about —50° C. and room temperature are preferred with the secondary and tertiary alkyllithiums. The most preferred temperatures are within the range of from 0° to 40° C. Lower temperatures are required when the lithiations are carried out at high concentrations or in the absence of solvent. Because of the extraordinary activity of the amines with the organolithium compounds, the lithiations are generally carried out in inert solvents at concentrations ranging from about 0.1 and 5.0 molar. Any inert solvent may be used, but for practical purposes, the preferred solvents are the saturated hydrocarbons mentioned above (e.g. isopentane, n-heptane, cyclohexane, etc.).

EXAMPLE 6

A 0.5 M solution of sec.-butyllithium TMEDA in n-heptane was prepared by adding 1 ml. of a 1 M TMEDA solution to 1 ml. of a 1 M sec.-butyllithium solution. The solution was charged to a nuclear magnetic resonance tube and frozen in liquid nitrogen within one minute after mixing. The solution was then brought to room temperature in the NMR spectrometer and the NMR spectrum was obtained repeatedly over a 24 hours period. Lithiation of TMEDA was about 50% complete in about 5 to 10 minutes and appeared to be complete in 24 hours. Only about 5% decomposition products were observed as compared to 10–20% in the case of an identical experiment using n-butyllithium and TMEDA.

The procedure set forth in the paragraph immediately above was followed except that the sec.-butyllithium·TMEDA solution was aged at 0° C. and the NMR spectra were run at —5° C. The same results were obtained except that the lithiation rate was 8–10 times slower at 0° C. than at room temperature.

EXAMPLE 7

The procedures set forth in Example 6 were repeated using a 2:1 molar ratio of sec.-butyllithium to TMEDA. Lithiations occurred at comparable rates to those set forth in Example 6, but only traces of decomposition products were observed.

Based on this result, a 1:1 complex was prepared by adding the TMEDA in two portions, allowing complex formation and some lithiation to take place before adding the second portion. This procedure gave purer lithiated TMEDA products than those procedures in which the TMEDA was added all at once. Therefore, the preferred procedure for preparing a lithiated amine involves a slow or serial addition of the amine to the organolithium compound.

EXAMPLE 8

Following the procedure set forth in Example 6, a 0.5 M solution of sec.-butyllithium·N,N,N',N'-tetraethyl-1,2-ethanediamine complex was allowed to age at room temperature. Lithiation was about 90% complete in 23 hours.

EXAMPLE 9

Following the procedure of Example 6, a 0.5 M solution of sec.-butyllithium·N,N,N',N'-tetramethyl-cyclohexanediamine ("TMCHDA") complex was allowed to age at room temperature. Lithiation of an N—$CH_3$ group occurred rapidly and the lithiated TMCHDA was obtained quantitatively within 24 hours. Addition of toluene to the lithiated TMCHDA produced benzyllithium·TMCHDA, illustrating the use of this reagent for preparing other lithiated amine compounds by metalation.

EXAMPLE 10

To 8 mmoles n-butyllithium in 28 ml. n-heptane was added 8 ml. 1 M TMEDA. After aging for 15 minutes, the n-heptane was removed in a vacuum rotary evaporator over a one-hour period and the neat (i.e. solventless) complex was allowed to age at room temperature. After four days of aging at room temperature, the aged complex was vacuum dried for two hours and a sample was dissolved in cyclohexane. NMR analysis of the cyclohexane solution of the sample showed that lithiated TMEDA was obtained together with a small amount of decomposition product similar to the results obtained from carrying out the aging reaction in solution. These results indicate that the presence or absence of a solvent is not critical with respect to the aging reaction.

EXAMPLE 11

A solution of 4 mmoles BuLi in 2 ml. n-heptane was added slowly with stirring to 40 mmoles pure TMEDA at 0° C. The BuLi reacted completely within 5 hours at 25° C., but metalated TMEDA was not obtained. The products were identified as lithium dimethylamide and vinyl dimethylamine. Therefore, excess amine of the TMEDA type is undesirable as it promotes decomposition of the metalated TMEDA.

EXAMPLE 12

A 1 M solution of sec.-BuLi·TMEDA in heptane was prepared by adding the TMEDA to sec.-BuLi dropwise at 0° C. and then warming the solution to 25° C. After 3 hours, the metalated TMEDA was isolated by vacuum drying the reaction mixture. The yield was 0.116 g. (calc'd. 0.122 g.). Characterization of the metalated TMEDA was done by NMR analysis in $C_6D_{12}$ solution.

EXAMPLE 13

A 1 H stock solution of lithiated TMEDA in n-heptane was prepared by adding 25 ml. 2 M TMEDA with cooling to 25 ml. 2 M n-butyllithium and allowing the reactants to stand over a one month period at 25° C. in a sealed bottle under nitrogen.

The resultant lithiated TMEDA was then employed as a catalyst in the polymerization of butadiene. To 19.2 g. butadiene in 80 ml. n-heptane was added 4 ml. of the above 1 M solution of lithiated TMEDA. The polymerization reaction was carried out over a 2 hour period at 25° C. and thereafter terminated by the addition of 1 ml. methanol; the catalyst was removed by water washing and the heptane solution was dried over potassium carbonate and vacuum stripped at 70° C. and 15–20 mm.

pressure. The yield of polybutadiene was 18.7 g.; infrared analysis indicated that the polymer had the following microstructure: 73.3% vinyl unsaturation groups, 16.1% trans-unsaturation groups, and 10.6% cis-unsaturation groups. The polybutadiene contained 0.13 wt. percent nitrogen in the end groups resulting from initiation by the lithiated TMEDA.

EXAMPLE 14

A lithiated polymeric amine was prepared by reacting 1 mmole of n-butyllithium with 2.2 mmoles (based on the monomeric units) of poly-(N-n-butyl - ethyleneimine) (681 number average molecular weight) in 10 ml. n-heptane for 30 minutes at ambient temperature. A solution of 5.71 g. butadiene in 46 ml. n-heptane was added and polymerization was allowed to proceed over a two hour period at room temperature. The polymeric lithiated amine dissolved as the butadiene polymerization reaction proceeded. The catalyst residues were extracted from the reaction solution by extraction with aqueous HCl and with water. After drying the solution over potassium carbonate, it was vacuum dried, yielding 4.98 g. of polybutuadiene containing 0.52 wt. percent nitrogen from initiation by the lithiated polymeric amine. The polybutadiene microstructure was found to be (by infrared analysis) 69.6% vinyl unsaturation, 22.6% trans-unsaturation and 17.7% cis-unsaturation.

EXAMPLE 15

A solution containing 7.6 mmoles n-butyllithium·TMEDA in one liter of n-hexane was allowed to age 3 days at room temperature to obtain the lithiated TMEDA. Pure isoprene (55 ml.) was added and the polymerization reaction was allowed to proceed at 25° C. for 3 days. The catalyst was killed with isopropyl alcohol and the total solution was vacuum dried, yielding 33.9 g. solid polyisoprene. NMR analysis showed that 53% 3,4-, 29% 1,2-, and 18% 1,4-addition had taken place; this is a higher percentage of 1,2-addition than has been obtained with other anionic-type catalysts.

EXAMPLE 16

Using 2 mmoles of the lithiated TMEDA stock solution prepared in Example 13, 9.49 g. of redistilled styrene in 100 ml. n-heptane was polymerized at 0° C. for one hour. The catalyst was quenched with 1 ml. methanol and the clear solution above the polymer phase was discarded; the solid was extracted with hot methanol, filtered and vacuum dried, resulting in a yield of 4.7 g. The number average molecular weight of the resultant polystyrene was 3530 and it had a nitrogen content of 0.66 wt. percent; this nitrogen content yields a calculated molecular weight of 4200, assuming that one TMEDA end group was present per polymer molecule. Therefore, nearly every polymer chain in the polystyrene was initiated by the lithiated TMEDA and only a few polymer chains contain no catalyst end groups due to the chain transfer reactions.

EXAMPLE 17

A solution of 2 mmoles sec.-butyllithium and 2 mmoles TMBDA in 3.25 ml. n-heptane was allowed to react overnight at 25° C. NMR analysis showed that lithiation of the TMBDA was complete.

The lithiated TMBDA solution (2 ml.) was used to polymerize styrene in accordance with the procedure set forth in Example 16. A yield of 1.9 g. of polystyrene was obtained and it was found that this polymer contained 0.25 wt. percent nitrogen resulting from initiation by the lithiated TMBDA.

EXAMPLE 18

The procedure of Example 17 was repeated except that a different tertiary diamine, N,N,N',N'-tetramethyl - 1,6-hexanediamine ("TMHDA") was used instead of TMBDA. Lithiation was very slow at room temperature so the solution was heated to 70° C. before charging 2 ml. of the aged catalyst solution to the styrene. The resultant yield of polystyrene was 5.3 g. and the nitrogen content was 0.19 wt. percent. Thus, tertiary amines such as TMHDA may be lithiated under forcing conditions, especially with the aid of secondary or tertiary alkyllithiums.

EXAMPLE 19

Acrylonitrile (4.37 g.) in 100 ml. toluene was polymerized using 1 ml. of the lithiated TMEDA solution prepared in Example 13. After one hour at −78° C., the catalyst was quenched with 1 ml. methanol. The polyacrylonitrile was filtered, extracted with warm methanol and dried; the yield of the polyacrylonitrile was 1.2 g.

EXAMPLE 20

Following the procedure of Example 7, a heptane solution of lithiated TMEDA is prepared by aging sec.-butyllithium·TMEDA overnight at room temperature. A solution of 50 ml. butadiene and 50 ml. of freshly distilled styrene in 400 ml. n-heptane is charged to a reactor, cooled to 15° C. and a solution of 1 mmole of the aged lithiated TMEDA is added. The reaction temperature is then raised to 25° C. and the polymerization reaction is allowed to proceed for 4 hours at 25° C. After killing the catalyst with methanol, the solution is poured into alcohol to precipitate the polymer, the alcohol solution is decanted off, the polymer is again washed with alcohol containing an oxidation inhibitor such as 2,6-di-tert.-butyl para-cresol and then the polymer is vacuum dried. A random styrene-butadiene copolymer having approximately the feed composition is obtained in high yield. The vinyl content of the polybutadiene moiety is about 60%.

EXAMPLE 21

Lithiated TMEDA is prepared in accordance with the procedures set forth in Example 20 and 5 mmoles of this catalyst is added to 100 ml. of a n-heptane solution containing 10.8 g. butadiene and polymerization is allowed to proceed for 2 hours at 25° C. After cooling to −50° C., a solution of 10 g. acrylonitrile in 50 ml. n-heptane is added to the polydienyl-lithium solution and polymerization is continued for another hour at −50° C. Alcohol is then added to precipitate the polymer, and the polymer is thereafter washed with alcohol and vacuum dried; the resultant polymer is a solid, block copolymer which consists of a block of high vinyl polybutadiene attached to a block of polyacrylonitrile.

EXAMPLE 22

Lithiated TMEDA was prepared in accordance with the procedure set forth in Example 13, except that the aging time was 11 days. A solution of 2.2 mmoles of the lithiated TMEDA was added to 0.364 g. (2 mmoles) benzophenone in 3 ml. n-heptane. An immediate deep blue-green color was obtained. After 15 minutes, 1 ml. water and 0.3 ml. conc. HCl were added yielding a clear, pale yellow solution plus a light yellow aqueous phase. The heptane phase was discarded and the aqueous phase was extracted twice with n-heptane to remove unreacted benzophenone from the reaction product. Addition of 6 ml. heptane plus excess potassium carbonate yielded a dry heptane solution which in turn yielded 0.33 g. of a product identified as a new tridentate chelating agent having the structure:

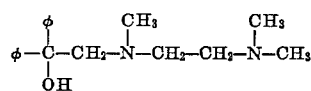

EXAMPLE 23

Lithiated TMEDA was prepared in accordance with the procedure set forth in Example 13, except that the aging time was 10 days. A solution of 11 mmoles of the lithiated TMEDA in 11 ml. n-heptane was added to a solution of 0.98 g. cyclohexannone (10 mmoles) in 25 ml. n-heptane at 0° to −20° C. After reacting for one hour at 25° C., the reaction mixture was treated with 1.52 g.

NaHSO$_4$·H$_2$O (11 mmoles) and 5 drops of methanol to remove the lithium from the product. The salts were filtered off and the solution was vacuum dried yielding 1.0 g. product which was identified as a new tridentate chelating agent having the structure:

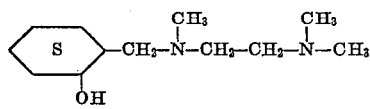

EXAMPLE 24

The procedure of Example 23 was repeated except that 0.98 g. cyclohexene oxide (10 mmoles) was used instead of cyclohexanone. The product weighed 0.78 g. and was identified as a new tridentate chelating agent having the structure:

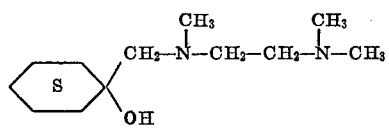

EXAMPLE 25

The procedure of Example 23 was repeated except that the reactants were 0.05 mole pyridine and 0.0065 mole lithiated TMEDA and the reaction mixture was heated to 80° C. for 8 hours. The product weighed 0.73 g. and was identified predominantly as being a new tridentate chelating agent having the expected structure of:

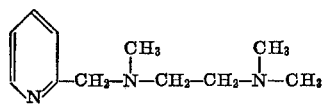

EXAMPLE 26

A solution of 10 mmoles n-butyllithium-TMEDA in 10 ml. n-heptane was allowed to age 3 days at room temperature to obtain lithiated TMEDA. The solution was carbonated by pouring it into a slurry of powdered Dry Ice in heptane. The lithium salt precipitated and was filtered, acidified with HCl, extracted with ether to remove by-product and the aqueous solution was vacuum dried, yielding 1.2 g. white crystals plus a viscous liquid. The mixture appeared to consist of the hydrochloride salts of:

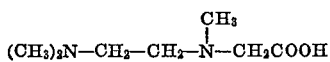

The white crystals and viscous liquid mixture was dissolved in water and sodium hydroxide was added to raise the pKa to 9. Vacuum drying the solution yielded the sodium salt of the new amino acid having the structure:

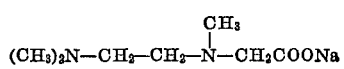

This example illustrates that a wide variety of new amino acids can be made by carbonation of a wide variety of amines which are lithiated at

positions; in particular, the lithiated-"preferred" amines upon carbonation yield the most unique and useful amino acids.

EXAMPLE 27

Following the procedure of Example 23, a solution of 22 mmoles of lithiated TMEDA in 22 ml. n-heptane is added to solution of 2.99 g. methyl benzoate (11 mmoles) in 25 ml. n-heptane, hydrolyzed and recovered. The product is a new pentadentate chelating agent having the structure:

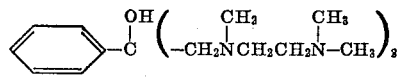

EXAMPLE 28

Following the procedure of Example 23, a solution of 5 mmoles silicon tetrachloride in 25 ml. n-heptane is added slowly to 22 ml. 1 M lithiated TMEDA in n-heptane. The solution is heated to precipitate lithium chloride, filtered hot and vacuum stripped to recover the new octadentate chelating agent:

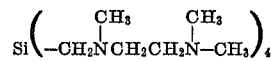

EXAMPLE 29

A 0.5 M solution of lithiated TMPDA is prepared according to the procedure of Example 12 using sec-BuLi and TMPDA. To 17 mmoles lithiated TMPDA in 50 ml. n-heptane is added dropwise 5 mmoles phosphorous trichloride (0.685 g.). The solution is heated to precipitate lithium chloride, filtered hot and vacuum stripped to isolate the new heptadentate chelating agent.

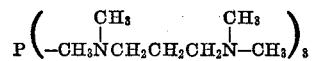

EXAMPLE 30

A 0.5 M solution of lithiated TMCHDA was prepared following the procedure of Example 9. To a cold solution of 10 mmoles lithiated TMCHDA in 20 ml. n-heptane is added dropwise 5 mmoles (0.515 g.) sulfur dichloride. The product is isolated as in Example 29 yielding the new pentadentate chelating agent:

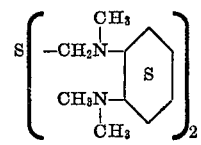

It is to be understood that this invention is not limited to the specified examples set forth above which have been offered merely as illustration and that modifications can be made without departing from the spirit and the scope of the invention which is set forth in the following claims.

What is claimed is:

1. A method for forming an amine adduct of a compound [that reacts in a "Grignard" manner], said method comprising the step of reacting an alpha mono lithiated amine, said amine being characterized by one of the following structural formulae:

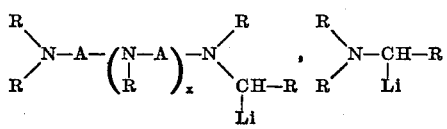

or

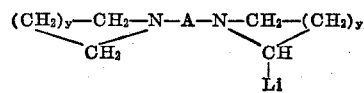

wherein R can be the same or different and is a C$_1$–C$_{10}$ alkyl; X is an integer of 0 to 10,000; y is an integer of 0 to 3; and A i sa radical which is (1) a cycloaliphatic radical or a cycloaliphatic radical containing C$_1$–C$_4$ alkyl groups, said radicals having ring structures of 4 to 7 members and being attached to the nitrogen atoms at 1,2 or 1,3 positions on said ring; or (2) a radical consisting of 1 to 20 methylenic groups wherein each methylenic group contains 0 to 2 monovalent hydrocarbon radicals of 1 to 6 carbon atoms, with a compound containing either a carbonyl or thiocarbonyl, moiety in its chemical structure, under conditions of temperature, concentrations of reactants and pressures sufficient to form said amine adduct.

2. A method according to claim 1, further including the step of hydrolyzing said amine adduct.

3. A method according to claim 1, wherein said compound is one selected from the group consisting of cyclic and acyclic aldehydes, ketones, ketenes, alpha haloketones.

4. A method according to claim 1, wherein said compound is a quinone.

5. A method according to claim 1, wherein said compound is an ester.

6. A method according to claim 1, wherein said compound is a carbonyl halide.

7. A method according to claim 1, wherein said reaction is carried out at a temperature ranging from −100 to 100° C. and wherein the concentration of the reactants ranges from 0.1 to 10 moles of said lithiated amine per mole of said compound that contains either a carbonyl or a thiocarbonyl moiety.

8. A method according to claim 1, wherein one of the reactants is lithiated N,N,N′,N′-tetramethyl-1,2-ethane diamine.

9. A process according to claim 2 wherein said amine is tetramethylethylene diamine and said compound is benzophenone.

References Cited

Royals "Advanced Organic Chemistry" (1956), p. 683.

LEWIS GOTTS, Primary Examiner

D. R. PHILLIPS, Assistant Examiner

U.S. Cl. X.R.

260—293.63, 29 GR, 239 A, 239 E, 326.5 G, 563 R, 570.6, 583 P